Patented Apr. 28, 1931

1,802,752

UNITED STATES PATENT OFFICE

SIDNEY M. CADWELL, OF LEONIA, AND LUDWIG MEUSER, OF BERGENFIELD, NEW JERSEY, ASSIGNORS TO THE NAUGATUCK CHEMICAL COMPANY, OF NAUGATUCK, CONNECTICUT, A CORPORATION OF CONNECTICUT

PROCESS OF TREATING RUBBER AND PRODUCTS OBTAINED THEREBY

No Drawing. Application filed January 29, 1927. Serial No. 164,653.

This invention relates to materials which have the property of improving rubber and retarding its deterioration, particularly the deterioration ascribable to oxidation. The invention is also concerned with a new class of such materials, namely those containing the structure characteristic of the ethanol amines.

The primary object of the invention is to provide a new class of materials adapted to retard the deterioration of rubber. A further object is to provide materials which will improve the resistance of rubber to deterioration by oxidation without causing an appreciable amount of discoloration of the rubber during vulcanization or thereafter. A further object is to provide an inexpensive highly efficient class of those materials now commonly styled "age improvers". A still further object is to provide age improvers which do not cause appreciable discoloration of bleached fabrics or fibres, including paper with which rubber may come in contact.

With a preferred embodiment in mind but without intention to limit the invention beyond what may be required by the prior art, the invention briefly described consists in vulcanizing rubber in the presence of an ethanol amine or a derivative thereof.

The class of age improvers herein described includes organic compounds containing the general structure of the ethanol amines. This class may be illustrated by the characteristic grouping $=N-C-C-O$, it being understood in this typical group that substitutions are possible on the nitrogen, oxygen and carbon atoms, thereby comprehending the ethanol amines and their derivatives, whether open chain or heterocyclic in structure.

To illustrate the invention 1 part of a mixture of about 75% of triethanol amine and about 25% of diethanol amine is mixed with 100 parts of rubber, 40 parts of zinc oxide, 3 parts of sulphur and 0.3 parts of heptaldehyde aniline condensation product diluted with spindle oil. This stock may be vulcanized in a mold for 30 minutes at 40 lbs. steam pressure. The resulting stock is well vulcanized and shows only a slight discoloration due to the presence of the deterioration retarder. This stock is considerably more resistant to deterioration, in an oxygen bomb at 140° F. or at 158° F., and at 212° F. in air, than a similar stock containing no age retarder. The resistance to deterioration by oxidation is practically the same with 1 part of the above mixture as that obtained with 3 parts of the condensation product of acetaldehyde and aniline prepared in strongly acid solution. During heat aging of the ethanol amine stock above described, there is no development of discoloration, whereas in the case of aldehyde-aromatic amine condensation products there is a development of discoloration. A discoloration may also be imparted to fabrics such as bleached duck or paper in the form of paper boxes with which the rubber may be in contact. The mixture of diethanol amine and triethanol amine above described does not discolor these bleached materials.

Instead of employing a mixture of 75% of triethanol amine and 25% diethanol amine, similar results may be obtained with either one of these materials alone. Other illustrations of compounds falling within this class are substituted diethanol amines, trienthanol amines, mono ethanol amines, as for example dimethyl ethanol amine, the formaldehyde diethanol amine condensation product, the acetaldehyde diethanol amine condensation products prepared in neutral and in acid solution, and the diethanol amine sulphate. Other compounds falling within the same class may be obtained by converting diethanol amine into a heterocyclic structure, substitutions being permissible, as long as the ring structure still contains the grouping indicated as $=N-C-C-O$.

Triethanol amine or the other representatives of the class may be employed in any type of stock provided that due cognizance is taken of the fact that these materials have a certain amount of accelerating power. For instance the best results are obtained in the presence of low percentages of sulphur. These compounds may be employed in admixture with or in the presence of aldehyde amine accelerators or anti-oxidants or age improvers. To illustrate this a mixture of acetaldehyde aniline acid condensation product with 10-20% of diethanol amine or triethanol amine or a mixture of the two as described above forms a wet powder. If 30% of the amines be used in connection with the aldehyde amine acid condensate, the resulting mixture is putty-like in consistency. These mixtures are not only valuable retarders of deterioration in rubber, but are very easy to handle. The accelerating power of the ethanol amines, as well as their valuable age-improving properties may be utilized to good advantage with any accelerator, observing of course the usual precaution of properly balancing the materials employed in the mixing. The same vulcanizing range may thus be secured, but with less of the product employed as the accelerator, and at the same time valuable age resisting properties are imparted to the stock. One advantage of the blending or mixing of the ethanol amines with accelerators becomes at once apparent in view of the fact that many accelerators are rather expensive whereas the ethanol amines are inexpensive. The same curing range and other physical properties, together with valuable resistance to aging by oxidation can be gained in a stock at a lesser accelerator cost per pound of stock.

The fact that diethanol amine and triethanol amine do not discolor rubber appreciably and do not discolor bleached fabrics makes these deterioration retarders especially valuable in the production of light colored rubber goods and in rubber articles which are in part made up of bleached fabric or duck, for example rubber soled canvas footwear.

Having thus described our invention, what we claim and desire to protect by Letters Patent is:

1. A method of treating rubber which comprises adding to a vulcanizable rubber composition a mixture of diethanol amine and triethanol amine, and vulcanizing the rubber.

2. As a new product rubber vulcanized in the presence of a mixture of diethanol amine and triethanol amine.

3. A method of treating rubber which comprises adding to a vulcanizable rubber composition an age improving material comprising a compound having the general formula $(H)_xN(C_2H_4OH)_y$, where $x$ may be 1 or 0, and $y$, correspondingly may be 2 or 3, and vulcanizing the rubber.

4. As a new product rubber vulcanized in the presence of an age improving material comprising a compound having the general formula $(H)_xN(C_2H_4OH)_y$, where $x$ may be 1 or 0, and $y$ correspondingly may be 2 or 3, and vulcanizing the rubber.

Signed at New York, county and State of New York, this 24th day of January, 1927.
SIDNEY M. CADWELL.

Signed at New York, county and State of New York, this 24th day of January, 1927.
LUDWIG MEUSER.